United States Patent
Naveh et al.

(10) Patent No.: US 12,380,352 B2
(45) Date of Patent: Aug. 5, 2025

(54) AUXILIARY QUBITS ANALYSIS BASED ON PARTIAL COMPILATION OF QUANTUM PROGRAMS

(71) Applicant: Classiq Technologies LTD., Tel Aviv (IL)

(72) Inventors: Amir Naveh, Haifa (IL); Shmuel Ur, Shorashim (IL); Eyal Cornfeld, Ramat Gan (IL); Ofek Kirzner, Haifa (IL)

(73) Assignee: Classiq Technologies LTD., Tel Aviv (IL)

(*) Notice: Subject to any disclaimer, the term of this patent is extended or adjusted under 35 U.S.C. 154(b) by 866 days.

(21) Appl. No.: 17/648,691

(22) Filed: Jan. 24, 2022

(65) Prior Publication Data
US 2023/0237360 A1    Jul. 27, 2023

(51) Int. Cl.
*G06N 10/20* (2022.01)
*G06F 11/362* (2025.01)
*G06F 11/3668* (2025.01)

(52) U.S. Cl.
CPC ......... *G06N 10/20* (2022.01); *G06F 11/3624* (2013.01); *G06F 11/3668* (2013.01)

(58) Field of Classification Search
CPC ........ G06N 10/00; G06N 10/20; G06N 10/40; G06N 10/60; G06N 10/70; G06N 10/80; G06F 9/30101; G06F 8/41; G06F 9/54; G06F 11/3624; G06F 11/3668; H10D 64/27; H10D 48/3835; B82Y 10/00; H03K 19/195; H03K 19/003; G02F 1/01725; H03M 1/66
See application file for complete search history.

(56) References Cited

U.S. PATENT DOCUMENTS

| | | | |
|---|---|---|---|
| 11,119,773 B1 * | 9/2021 | Soeken | G06F 15/82 |
| 11,294,797 B1 * | 4/2022 | Naveh | G06F 11/3696 |
| 11,373,114 B1 * | 6/2022 | Naveh | G06N 10/00 |
| 11,429,512 B1 * | 8/2022 | Naveh | G06N 10/00 |

(Continued)

FOREIGN PATENT DOCUMENTS

| | | | | |
|---|---|---|---|---|
| CA | 3147706 A1 * | 3/2021 | | H10D 64/27 |
| JP | 2022532469 A * | 7/2022 | | G06N 3/045 |

(Continued)

OTHER PUBLICATIONS

International Search Report from International Application No. PCT/IL2022/051308 dated Jun. 28, 2023, 10 pgs.

*Primary Examiner* — Steven P Sax
(74) *Attorney, Agent, or Firm* — Tutunjian & Bitetto, P.C.

(57) ABSTRACT

An apparatus, product and method includes partially compiling a quantum circuit from an initial cycle and until one or more intermediate cycles. A partial executable quantum circuit and measurements regarding a group of candidate auxiliary qubits are obtained by executing the partial executable quantum circuit multiple times and classifying the group of candidate auxiliary qubits to a qubit class with respect to a target group of qubits. The qubit class indicates that the group of candidate auxiliary qubits is not entangled with the target group. The quantum circuit is modified to apply a cleaning process on the group of candidate auxiliary qubits, whereby a modified quantum circuit is obtained. The modified quantum circuit is compiled thus obtaining an executable quantum circuit.

25 Claims, 4 Drawing Sheets

(56) References Cited

U.S. PATENT DOCUMENTS

| | | | |
|---|---|---|---|
| 11,437,995 B1* | 9/2022 | Haah | G06N 10/00 |
| 11,475,347 B1* | 10/2022 | Rudolph | G02B 6/12 |
| 12,093,785 B2* | 9/2024 | Putterman | G06N 10/40 |
| 12,204,879 B2* | 1/2025 | Shi | G06F 8/41 |
| 2018/0144262 A1* | 5/2018 | Roetteler | G06N 10/70 |
| 2018/0181685 A1 | 6/2018 | Roetteler et al. | |
| 2020/0119748 A1* | 4/2020 | Lucarelli | H03M 13/11 |
| 2020/0242207 A1 | 7/2020 | Shehab et al. | |
| 2021/0125094 A1* | 4/2021 | Chamberland | G06N 10/20 |
| 2022/0156441 A1* | 5/2022 | Campbell | G06N 10/00 |
| 2022/0198311 A1* | 6/2022 | Delfosse | G06N 10/70 |
| 2022/0207406 A1* | 6/2022 | Kapit | G06N 10/40 |
| 2023/0016817 A1* | 1/2023 | Premaratne | H03K 19/003 |
| 2023/0034436 A1* | 2/2023 | Frisch | G06N 10/20 |
| 2023/0196156 A1* | 6/2023 | Chen | G06N 10/20 |
| | | | 706/62 |
| 2023/0205490 A1* | 6/2023 | Jacak | G06N 10/20 |
| | | | 708/250 |
| 2023/0419157 A1* | 12/2023 | Wan | G06N 10/70 |

FOREIGN PATENT DOCUMENTS

| | | | | |
|---|---|---|---|---|
| WO | WO-2019244078 A1 * | 12/2019 | | B82Y 10/00 |
| WO | WO-2022081675 A1 * | 4/2022 | | G06N 10/40 |
| WO | WO-2022103945 A1 * | 5/2022 | | G06N 10/70 |

* cited by examiner

AUXILIARY QUBITS ANALYSIS BASED ON PARTIAL COMPILATION OF QUANTUM PROGRAMS

TECHNICAL FIELD

The present disclosure relates to quantum computing in general, and to selecting qubits and adding them to an auxiliary qubit pool that is used for quantum circuits, in particular.

BACKGROUND

Quantum computing is a computational paradigm that is fundamentally different from classic computing. In contrast to classic computing, which utilizes bits, quantum computing utilizes qubits. The qubits have unique features, as each qubit can be in superposition, several qubits can be entangled, and all operations on qubits besides measurement, referred to as quantum gates, must be reversible. Temporarily computed values are stored on additional helper qubits, referred to as auxiliary qubits. Qubits are a limited resource; therefore, the use of auxiliary qubits is restricted, and synthesis must find circuits that satisfy the number of available qubits.

BRIEF SUMMARY

One exemplary embodiment of the disclosed subject matter is a method comprising: partially compiling a quantum circuit, wherein the quantum circuit comprises a group of qubits that are being manipulated over a plurality of cycles, the plurality of cycles ordered in consecutive order, wherein the plurality of cycles comprise an initial cycle, one or more intermediate cycles and a final cycle, wherein the initial cycle is a first cycle in accordance with the consecutive order having no preceding cycles therebefore, wherein the final cycle is a last cycle in accordance with the consecutive order having no successive cycles thereafter, wherein the one or more intermediate cycles succeed the initial cycle and precede the final cycle in accordance with the consecutive order, wherein said partially compiling comprises compiling the quantum circuit from the initial cycle and until the one or more intermediate cycles, whereby obtaining a partial executable quantum circuit that excludes at least the final cycle; obtaining measurements regarding a group of one or more candidate auxiliary qubits, wherein the group of one or more candidate auxiliary qubits is comprised by the group of qubits, wherein said obtaining measurements comprises executing the partial executable quantum circuit multiple times; classifying the group of one or more candidate auxiliary qubits to a qubit class with respect to a target group of one or more qubits, wherein the group of qubits comprise the target group of one or more qubits, wherein the qubit class indicates that the group of one or more candidate auxiliary qubits is not entangled with the target group of the one or more qubits; modifying the quantum circuit to apply after the one or more intermediate cycles a cleaning process on the group of one or more candidate auxiliary qubits, whereby obtaining a modified quantum circuit; and compiling the modifying quantum circuit, thereby obtaining an executable quantum circuit, the executable quantum circuit comprising the last cycle, wherein the executable quantum circuit is configured to apply the cleaning process on the group of one or more candidate auxiliary qubits at or after the one or more intermediate cycles.

Optionally, the method comprises selecting, based on the qubit class, a cleaning process for cleaning the group of one or more candidate auxiliary qubits, wherein said selecting is performed with respect to at least two alternative cleaning processes.

Optionally, the cleaning process comprises performing a reset operation on the group of one or more candidate auxiliary qubits, performing a controlled propagation operation on the group of one or more candidate auxiliary qubits, performing a partial set operation on a portion of qubits within the group of one or more candidate auxiliary qubits, or the like.

Optionally, the measurements are obtained by sampling at least one density matrix of the group of one or more candidate auxiliary qubits after each execution of the partial executable quantum circuit.

Optionally, the method comprises determining a state of the group of one or more candidate auxiliary qubits at the one or more intermediate cycles based on the measurements, wherein the cleaning process is a controlled propagation operation, wherein the controlled propagation operation is based on the state of the group of one or more candidate auxiliary qubits.

Optionally, the target group of one or more qubits comprises all qubits to be utilized after the one or more intermediate cycles in accordance with the quantum circuit.

Optionally, the target group of one or more qubits comprises all qubits to be utilized within a functional block after the one or more intermediate cycles.

Optionally, classifying the group of one or more candidate auxiliary qubits is performed with respect to the target group of one or more qubits, wherein said classifying comprises classifying the group of one or more candidate auxiliary qubits into: a separable class with respect to the target group of one or more qubits, a product class with respect to the target group of one or more qubits, an entangled class with respect to the target group of one or more qubits, or the like, wherein the group of one or more candidate auxiliary qubits is not classified to the entangled class.

Optionally, said classifying comprises classifying the group of one or more candidate auxiliary qubits into one of: a pure class, and a mixed class.

Optionally, the qubit class is a mixed class, and the method further comprises selecting, in response to classifying the group of one or more candidate auxiliary qubits to the mixed class, the cleaning process to comprise a reset operation.

Optionally, the qubit class is a pure class, and the method further comprises selecting, in response to classifying the group of one or more candidate auxiliary qubits to the pure class, the cleaning process to comprise a reset operation, a partial set operation, or a controlled propagation operation.

Optionally, the method comprises classifying a second group of one or more candidate auxiliary qubits to a second qubit class with respect to the target group of one or more qubits, wherein the group of qubits comprise the second group of one or more candidate auxiliary qubits, wherein the second qubit class is different than the qubit class; and wherein said modifying the quantum circuit is configured to apply after the one or more intermediate cycles a second cleaning process on the second group of one or more candidate auxiliary qubits, wherein the cleaning process and the second cleaning process are of different cleaning process types.

Optionally, the method comprises determining a resource utilization of cleaning operations, and selecting the cleaning process based on the resource utilization.

Optionally, the group of one or more candidate auxiliary qubits comprises a logical qubit that is not assigned by the quantum circuit to a physical qubit of a quantum computer.

Optionally, said classifying is performed in response to a determination that the group of one or more candidate auxiliary qubits is idle, wherein the group of one or more candidate auxiliary qubits is determined to be idle based on a determination that the group of one or more candidate auxiliary qubits does not comprise an output qubit and is not utilized by at least one cycle succeeding the one or more intermediate cycles.

Optionally, said classifying is performed in response to a determination that the group of one or more candidate auxiliary qubits is idle, wherein the group of one or more candidate auxiliary qubits is determined to be idle based on a previous compilation of the quantum circuit.

Optionally, said classifying is performed in response to determining that a number of usages of the group of one or more candidate auxiliary qubits in the quantum circuit is below a threshold.

Optionally, said modifying the quantum circuit to apply after the one or more intermediate cycles a cleaning process on the group of one or more candidate auxiliary qubits, adds at least one cycle to the quantum circuit.

Optionally, the group of one or more candidate auxiliary qubits comprises two or more individual qubits, wherein said obtaining, said classifying, and said modifying are performed with respect to the two or more individual qubits.

Optionally, said modifying further comprises modifying the quantum circuit to apply, after the cleaning process, a restore process for restoring a state of the group of one or more candidate auxiliary qubits, wherein the restore process is performed in one or more second intermediate cycles succeeding the one or more intermediate cycles and preceding the final cycle.

Optionally, said modifying further comprises utilizing the group of one or more candidate auxiliary qubits as one or more respective auxiliary qubits in the modified quantum circuit.

Optionally, the method further comprises executing, by a quantum computer, the executable quantum circuit.

Another exemplary embodiment of the disclosed subject matter is an apparatus comprising a processor and coupled memory, said processor being adapted to: partially compile a quantum circuit, wherein the quantum circuit comprises a group of qubits that are being manipulated over a plurality of cycles, the plurality of cycles ordered in consecutive order, wherein the plurality of cycles comprise an initial cycle, one or more intermediate cycles and a final cycle, wherein the initial cycle is a first cycle in accordance with the consecutive order having no preceding cycles therebefore, wherein the final cycle is a last cycle in accordance with the consecutive order having no successive cycles thereafter, wherein the one or more intermediate cycles succeed the initial cycle and precede the final cycle in accordance with the consecutive order, wherein said partially compiling comprises compiling the quantum circuit from the initial cycle and until the one or more intermediate cycles, whereby obtaining a partial executable quantum circuit that excludes at least the final cycle; obtain measurements regarding a group of one or more candidate auxiliary qubits, wherein the group of one or more candidate auxiliary qubits is comprised by the group of qubits, wherein said obtain measurements comprises executing the partial executable quantum circuit multiple times; classify the group of one or more candidate auxiliary qubits to a qubit class with respect to a target group of one or more qubits, wherein the group of qubits comprise the target group of one or more qubits, wherein the qubit class indicates that the group of one or more candidate auxiliary qubits is not entangled with the target group of the one or more qubits; modify the quantum circuit to apply after the one or more intermediate cycles a cleaning process on the group of one or more candidate auxiliary qubits, whereby obtaining a modified quantum circuit; and compile the modifying quantum circuit, thereby obtaining an executable quantum circuit, the executable quantum circuit comprising the last cycle, wherein the executable quantum circuit is configured to apply the cleaning process on the group of one or more candidate auxiliary qubits at or after the one or more intermediate cycles.

Yet another exemplary embodiment of the disclosed subject matter is a system comprising a processor and coupled memory, said processor being adapted to: partially compile a quantum circuit, wherein the quantum circuit comprises a group of qubits that are being manipulated over a plurality of cycles, the plurality of cycles ordered in consecutive order, wherein the plurality of cycles comprise an initial cycle, one or more intermediate cycles and a final cycle, wherein the initial cycle is a first cycle in accordance with the consecutive order having no preceding cycles therebefore, wherein the final cycle is a last cycle in accordance with the consecutive order having no successive cycles thereafter, wherein the one or more intermediate cycles succeed the initial cycle and precede the final cycle in accordance with the consecutive order, wherein said partially compiling comprises compiling the quantum circuit from the initial cycle and until the one or more intermediate cycles, whereby obtaining a partial executable quantum circuit that excludes at least the final cycle; obtain measurements regarding a group of one or more candidate auxiliary qubits, wherein the group of one or more candidate auxiliary qubits is comprised by the group of qubits, wherein said obtain measurements comprises executing the partial executable quantum circuit multiple times; classify the group of one or more candidate auxiliary qubits to a qubit class with respect to a target group of one or more qubits, wherein the group of qubits comprise the target group of one or more qubits, wherein the qubit class indicates that the group of one or more candidate auxiliary qubits is not entangled with the target group of the one or more qubits; modify the quantum circuit to apply after the one or more intermediate cycles a cleaning process on the group of one or more candidate auxiliary qubits, whereby obtaining a modified quantum circuit; and compile the modifying quantum circuit, thereby obtaining an executable quantum circuit, the executable quantum circuit comprising the last cycle, wherein the executable quantum circuit is configured to apply the cleaning process on the group of one or more candidate auxiliary qubits at or after the one or more intermediate cycles.

Yet another exemplary embodiment of the disclosed subject matter is a computer program product comprising a non-transitory computer readable medium retaining program instructions, which program instructions when read by a processor, cause the processor to: partially compile a quantum circuit, wherein the quantum circuit comprises a group of qubits that are being manipulated over a plurality of cycles, the plurality of cycles ordered in consecutive order, wherein the plurality of cycles comprise an initial cycle, one or more intermediate cycles and a final cycle, wherein the initial cycle is a first cycle in accordance with the consecutive order having no preceding cycles therebefore, wherein the final cycle is a last cycle in accordance with the consecutive order having no successive cycles thereafter, wherein the one or more intermediate cycles succeed the initial cycle and precede the final cycle in accordance with the consecutive order, wherein said partially compiling comprises compiling the quantum circuit from the initial cycle and until the one or more intermediate cycles, whereby obtaining a partial executable quantum circuit that excludes at least the final cycle; obtain measurements regarding a group of one or more candidate auxiliary qubits, wherein the group of one or more candidate auxiliary qubits is comprised by the group of qubits, wherein said obtain measurements comprises executing the partial executable quantum circuit multiple times; classify the group of one or more candidate auxiliary qubits to a qubit class with respect to a target group of one or more qubits, wherein the group of qubits comprise the target group of one or more qubits, wherein the qubit class indicates that the group of one or more candidate auxiliary qubits is not entangled with the target group of the one or more qubits; modify the quantum circuit to apply after the one or more intermediate cycles a cleaning process on the group of one or more candidate auxiliary qubits, whereby obtaining a modified quantum circuit; and compile the modifying quantum circuit, thereby obtaining an executable quantum circuit, the executable quantum circuit comprising the last cycle, wherein the executable quantum circuit is configured to apply the cleaning process on the group of one or more candidate auxiliary qubits at or after the one or more intermediate cycles.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
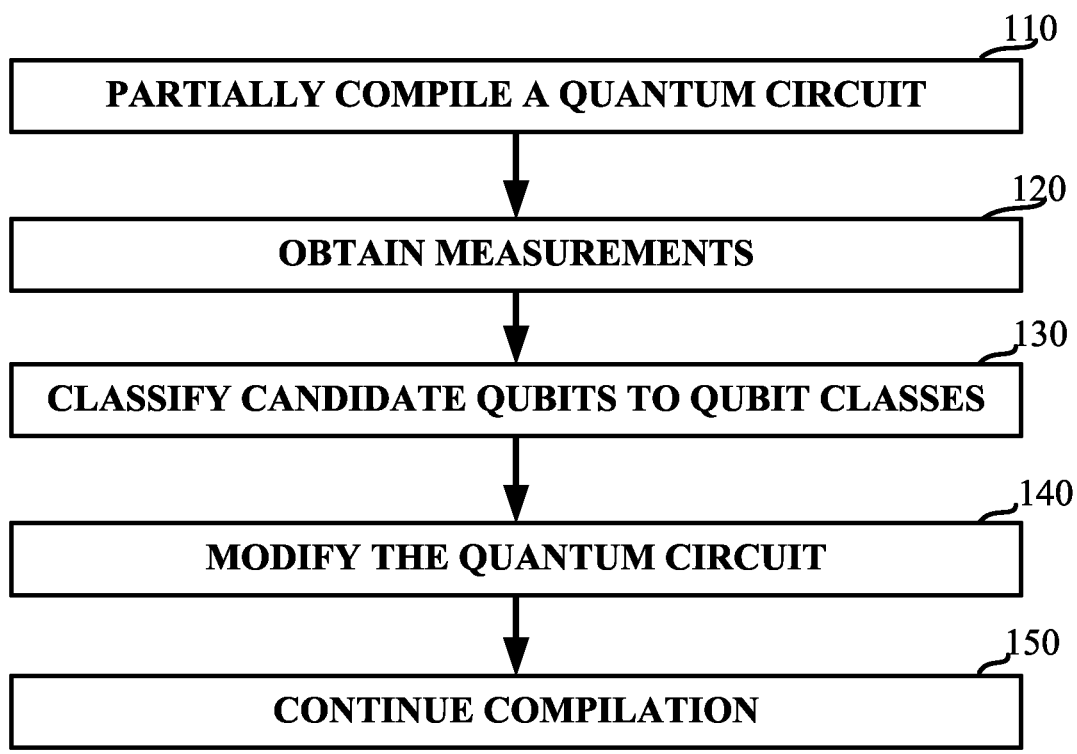
FIG. 1 shows an exemplary flowchart diagram of a method, in accordance with some exemplary embodiments of the disclosed subject matter.

One technical problem dealt with by the disclosed subject matter is to improve the quantum circuit development process. In some exemplary embodiments, quantum circuits may be designed, programmed or created by a user, a programmer, an operator, or the like, using gate-level programming, using functional-level code, using evolutionary computing techniques such as Quantum Genetic Algorithm (QGA), using genetic algorithms, or the like. In some exemplary embodiments, after an initial quantum circuit is created, it may go through multiple stages before becoming an executable quantum circuit that can be executed with a quantum computer, a simulation software thereof, or the like. In some cases, creating quantum circuits may be time consuming, computationally consuming, or the like, and it may be desired to overcome such drawbacks.

Another technical problem dealt with by the disclosed subject matter is to improve the compiled quantum circuits. In some exemplary embodiments, the compilation stage may comprise a process of allocating and scheduling logical qubits with respect to one or more gates, functional blocks, or the like. Additionally, or alternatively, the compilation stage may comprise assigning physical qubits to logical qubits. In some cases, the compiled quantum circuit may be improved by performing improved allocation, scheduling and assignments with respect to logical qubits, so as to reduce resources utilized during execution of the compiled quantum circuit, such as using a smaller number of gates, a smaller number of qubits, or the like.

Yet another technical problem dealt with by the disclosed subject matter is increasing a size of an auxiliary qubit pool. In some exemplary embodiments, an auxiliary qubit pool (also referred to as 'qubit pool') may be used to select auxiliary qubits for gates, functional blocks, or the like, e.g., during a compilation stage. In some cases, a quantum circuit may have multiple viable potential implementations that implement the quantum circuit and are applicable to the target quantum hardware. In some exemplary embodiments, different implementations may optimize on different criteria. In some exemplary embodiments, a tradeoff may exist between the number of qubits and the number of cycles that are used by a quantum circuit. In some cases, utilizing more qubits may reduce the number of cycles, thereby saving time, power, and computational resources. In some exemplary embodiments, increasing a number of qubits that are utilized may be performed by allocating available qubits in the qubit pool to the quantum circuit. In some cases, the qubit pool may not have available qubits that are not used, or may have a limited number of available qubits. In some exemplary embodiments, it may be desired to increase a number of available qubits in the qubit pool, such as in order to increase a time efficiency of the circuit's execution.

In some exemplary embodiments, a naive solution for extending the auxiliary qubit pool may include disentangling a target qubit from entangled qubits, such as by measuring the qubit, and then performing a reset operation to initialize the value of the qubit, thereby providing a clean and disentangled qubit. In some exemplary embodiments, any measuring operation performed on a qubit may disentangle the qubit. If a reset operation is performed after the measurement, the value of the qubit will become zero (e.g., the ground state), and the qubit will become available as an auxiliary qubit. In some exemplary embodiments, reset and measurement operations may not always enable to extend the auxiliary qubit pool, at least since a quantum state may collapse upon attempting to reset a qubit. In some cases, even if a reset operation is successful, it may be expensive in execution time. In some exemplary embodiments, it may be desired to overcome these drawbacks.

One technical solution provided by the disclosed subject matter may include measuring a state of qubits after a partial compilation of a quantum circuit, and selecting qubits to be added to the auxiliary qubit pool based on the measurement. In some exemplary embodiments, a cleaning operation type may be selected for the qubits according to their measured state, added to the circuit, and compilation may be continued on the modified circuit. In some exemplary embodiments, during a compilation of a quantum circuit, the compilation may be stopped at one or more intermediate cycles, measurements or simulations may be performed to detect qubits that are not entangled, and cleaning operations may be selected for the detected qubits.

In some exemplary embodiments, auxiliary qubits in an auxiliary qubit pool may be available for use by a circuit as temporary workspace. In some exemplary embodiments, an auxiliary qubit pool may be generated, obtained, or the like, to include clean and/or dirty qubits. In some exemplary embodiments, in case auxiliary qubits are initialized to a known computational basis state such as the |0> state, they may be referred to as 'clean' qubits. In some exemplary embodiments, in case auxiliary qubits are retained in an unknown and potentially entangled state with other parts of the quantum processor's memory, and must be restored before the circuit finishes, they may be referred to as 'dirty' qubits that are not immediately available. In some exemplary embodiments, clean qubits may be more valuable, in resource utilization terms, than dirty ones, as they allow for simpler and more compact circuit constructions. In some exemplary embodiments, dirty qubits may be more plentiful, since any temporarily unused qubit can be a borrowable dirty bit.

In some exemplary embodiments, in order to utilize dirty qubits, one or more disentangling and cleaning procedures may be performed in order to clean and free the dirty qubits from entanglements, so that they become available to be used. In some exemplary embodiments, the qubit pool may be retained in association with various functional data, metadata, associated data, or the like, such as whether auxiliary qubits are clean or dirty, a cost of an uncompute process that can be performed in order to clean a dirty auxiliary qubit (also referred to as "uncompute") for relevant qubits, whether auxiliary qubits are configured to be uncomputed, how many auxiliary qubits are currently used, an identity of the input qubits, an identity of the output qubits, or the like. For each dirty qubit, a cost of uncomputing the qubit may be determined, computed, retained, or the like. In some exemplary embodiments, it may be determined whether uncomputing a qubit will cause other qubits to be uncomputed as a result. In some exemplary embodiments, during compilation of a quantum circuit, the auxiliary qubit pool may be utilized for allocating auxiliary qubits to gates, functional blocks, or the like.

In some exemplary embodiments, the term 'compiling', as used herein, may refer to translating a gate-level or functional-level representation of a quantum circuit to an executable quantum circuit. In some exemplary embodiments, the executable quantum circuit may comprise a machine representation that can be executed by a quantum hardware compiler, a logical program circuit that can be executed or simulated by a classic computer, or the like.

In some exemplary embodiments, the term 'qubit', as used herein, may refer to a group of one qubit, or to a group of multiple qubits.

In some exemplary embodiments, the qubit pool may be utilized by a logical quantum program, a quantum circuit, or the like, such as in order to allocate auxiliary qubits for quantum circuits. In some exemplary embodiments, the logical quantum program may comprise a group of qubits that are being manipulated over a plurality of cycles. In some exemplary embodiments, the logical quantum program may be generated based on a gate-level representation of a quantum circuit, a functional-level representation of a quantum circuit, or the like. For example, a functional-level representation of a quantum circuit may be compiled or translated to a logical quantum program. In some exemplary embodiments, multiple orders and positions of gates, qubits, and functional blocks may be feasible. In some exemplary embodiments, the logical quantum program may be configured to determine, for each gate or functional block, a position of the gate or block within the quantum program, connections of qubits between the blocks, allocated qubits, cleaning processes of qubits, or the like.

In some exemplary embodiments, the logical quantum program may be provided to a hardware compiler. In some exemplary embodiments, the hardware compiler may convert the logical quantum program to a specific hardware implementation using gates and qubits. In some exemplary embodiments, each hardware compiler may be specifically tailored to a certain quantum computer, computer type, quantum hardware, or the like. In some exemplary embodiments, the hardware compiler may obtain the logical program, a low-level IR thereof, or the like, and implement based thereon a physical program, by allocating physical qubits for respective logical qubits, allocating physical gates for the logical gates, or the like. In some exemplary embodiments, the hardware compiler may compile the logical program circuit and synthesize a corresponding executable circuit for the quantum computer.

In some exemplary embodiments, the auxiliary qubit pool may be extended, increased in size, or the like, with respect to clean or usable qubits therein, using one or more techniques. For example, clean qubits may be added to the auxiliary qubit pool in case the number of available qubits in the qubit pool is determined to be insufficient, not optimal, is lesser than a threshold, or the like. As another example, clean qubits may be added to the auxiliary qubit pool regardless of the number of qubits in the qubit pool. In some exemplary embodiments, candidate qubits (also referred to as 'candidate auxiliary qubits') that can potentially be added to the qubit pool may be determined, detected, or the like. In some exemplary embodiments, the candidate qubits may be selected to include qubits that are idle, qubits that are not entangled with one or more target qubits, qubits that are not used by one or more subsequent cycles, qubits that are not output qubits, or the like. In some exemplary embodiments, the candidate qubits may be selected to exclude qubits that are auxiliary qubits, qubits that will be used by the quantum program, or the like.

In some exemplary embodiments, the candidate qubits may be analyzed to identify whether they are or are not entangled with a group of target qubits (e.g., associated with a functional block, utilized in the remaining cycles of the circuit, utilized in the circuit, or the like), whether they are entangled with qubits that are manipulated by subsequent cycles, or the like. In some exemplary embodiments, using qubits that are unentangled with target qubits, such as qubits that are separable or product from the target qubits, instead of actively disentangling entangled qubits, may save significant computational and time resources. In some exemplary embodiments, measurements may be executed in order to determine whether a qubit is entangled to one or more target qubits. In some exemplary embodiments, the entanglement state of candidate qubits with respect to the target qubits may be determined between compilation of a first portion of a quantum circuit, and compilation of a second portion of a quantum circuit, such as after every cycle, at one or more determined intermediate cycles, or the like. In some exemplary embodiments, the entanglement state of candidate qubits (referred to as 'qubit class') may be determined by performing multiple executions of the first portion of the quantum circuit, and measuring the qubits' density matrix, applying heuristics thereto, using a simulator, or the like.

In some exemplary embodiments, after detecting qubits with a desired entangled relationship from the target qubits (e.g., one or more qubits that separable or product from the target qubits), their value may be initialized or cleaned using one or more cleaning operation types, e.g., a controlled propagation operation, a reset operation, a partial set operation, or the like. In some exemplary embodiments, a cleaning operation type for a qubit may be selected based on an entanglement state of the qubit. In some exemplary embodiments, in case the qubit is disentangled with the target qubits, with the remaining qubits or portion thereof, or the like, a controlled propagation operation that is cheap in execution time but expensive in compilation time may or may not be used instead of performing a reset operation, which may be expensive in execution time. For example, a controlled propagation operation may be performed for a group of pure qubits, but not for subgroups thereof. In some cases, qubits may be cleaned by measuring a value or state of the qubit, and in some cases, subtract the measured value, e.g., as part of a controlled propagation operation. In some exemplary embodiments, the cleaned qubits may be added to the qubit pool, thereby extending the usable qubits of the qubit pool. In some exemplary embodiments, in some cases, a qubit that is measured and not cleaned may be usable, such as by retaining its value until a different value for the qubit is needed.

One technical effect obtained by the disclosed subject matter is extending a size of the qubit pool by adding thereto usable qubits that are selected according to their entanglement state, thereby saving resources. Instead of selecting entangled qubits and disentangling them, which may save significant computational and time resources, qubits that are already not entangled, or have low disentanglement costs, may be selected.

Another technical effect obtained by the disclosed subject matter is enabling to select a wide range of cleaning operations, according to a determined entanglement state of a qubit. In some exemplary embodiments, by halting the compilation of the program in the middle, and performing measurements at a classic computer, a selection of cleaning processes may be made in an informed and efficient manner.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing an exemplary flowchart diagram of a method, in accordance with some exemplary embodiments of the disclosed subject matter.

On Step 110, a quantum circuit may be partially compiled. In some exemplary embodiments, the quantum circuit may comprise a group of qubits that are being manipulated over a plurality of cycles. In some exemplary embodiments, the plurality of cycles may be ordered in consecutive order, defining an order between the cycles from an initial cycle to a final cycle. In some exemplary embodiments, the plurality of cycles may comprise an initial cycle, at least one intermediate cycle, a final cycle, or the like. In some exemplary embodiments, the initial cycle may be a first cycle in accordance with the consecutive order, having no preceding cycles therebefore. In some exemplary embodiments, the final cycle may be a last cycle in accordance with the consecutive order, having no successive cycles thereafter. In some exemplary embodiments, one or more intermediate cycles may succeed the initial cycle and precede the final cycle in accordance with the consecutive order. For example, in case of a quantum circuit with 50 cycles, the initial cycle may include the first cycle, the final cycle may include the $50^{th}$ cycle, and the intermediate cycle may include any cycle within the range of the $2^{nd}$ and the $49^{th}$ cycles, combination of cycles within the range, or the like. For example, the one or more intermediate cycles may comprise a first intermediate cycle for a first group of qubits, and a second intermediate cycle for a second group of qubits that are disjoint from the first group of qubits.

In some exemplary embodiments, partially compiling the quantum circuit may comprise compiling the quantum circuit from the initial cycle and until one or more intermediate cycles, whereby obtaining a partial executable quantum circuit that excludes at least the final cycle. For example, a partial compilation for a quantum circuit with 50 cycles may include reaching cycle 30 with a first qubit, reaching cycle 20 with a second qubit, or the like. As an example, the partial compilation may compile a two different and unrelated functional blocks, Block A, which ends on cycle 50 and Block B, which ends earlier on cycle 20. In the partial compilation, the state of qubits that are processed in Block A at cycle 50 may therefore be known, while for qubits that are processed in Block B—their state at cycle 20 may be known. In some exemplary embodiments, partially compiling the quantum circuit may be performed for one or more intermediate cycles, e.g., iteratively.

On Step 120, measurements regarding at least one group of candidate auxiliary qubits (also referred to as 'candidate auxiliary qubit') may be obtained, performed, or the like, e.g., using multiple executions of the partially compiled quantum circuit, simulations, or the like. In some exemplary embodiments, the measurements may be performed after partially compiling the quantum circuit, using the partially compiled quantum circuit for the measurement execution. In some exemplary embodiments, each candidate auxiliary qubit may refer to a group of qubits including a single qubit, a group of two or more qubits, or the like, that are comprised within, or selected from, the entire group of qubits of the quantum circuit that are being manipulated. In some cases, the measurements may be performed from an initial cycle until one or more intermediate cycles that correspond to respective qubits. In some cases, the measurements may be performed from one or more first intermediate cycles until one or more second intermediate cycles that correspond to respective qubits. In some exemplary embodiments, the measurements may be configured to estimate or determine one or more states, values, properties, statuses, or the like, of at least one candidate auxiliary qubit. In some exemplary embodiments, the number of executions of the partial executable quantum circuit may be determined based on a threshold, a user input, heuristics, an optimizing algorithm, or the like.

In some exemplary embodiments, the partial executable quantum circuit may be executed on a classic computer. Alternatively, any other computing device may be used for execution, such as a quantum computer, a simulator, or the like. In some exemplary embodiments, a candidate auxiliary qubit may comprise a logical qubit that is not assigned by the quantum circuit to a physical qubit of a quantum computer.

In some exemplary embodiments, the measurements may be performed by executing the program, e.g., the partial executable quantum circuit, multiple times over one or more cycles, and sampling the density matrix of the qubits after each execution, thereby performing a qubit analysis. In some exemplary embodiments, a density matrix may indicate all the states of a qubit after every manipulation, change or gate operation that is performed on the qubit. In some exemplary embodiments, the density matrix may be affected by gates, functional blocks, or the like, that manipulate the qubit prior to the intermediate cycles. In some exemplary embodiments, in case a qubit was not utilized in a cycle, its density matrix may remain unchangeable or identical to the density matrix before the cycle. In some exemplary embodiments, based on the density matrix of a qubit, the qubits status may be determined. In some cases, the density matrix may comprise a noise level of a qubit, indicating a probability of error of a qubit's state. In case the qubit was not manipulated during a specific cycle, only a noise status of the qubit may be updated, e.g., as the noise may increase over time.

In some exemplary embodiments, the measurements may be performed by executing the program, e.g., the partial executable quantum circuit, multiple times over one or more cycles, and applying one or more quantum tomography techniques, thereby performing a qubit analysis. In some exemplary embodiments, the state of a group of qubits may be assessed in one or more manners, such as by using quantum tomography, using a full state tomography, or the like, as disclosed in 'en.wikipedia.org/wiki/Quantum_tomography', which is hereby incorporated by reference in its entirety for all purposes without giving rise to disavowment.

In some exemplary embodiments, the measurements may be obtained by executing the partial executable quantum circuit multiple times, and sampling the density matrixes of the qubits after each execution, during executions, or at any other timeframe, utilizing quantum tomography techniques, or the like. For example, an intermediate cycle may be cycle 800, and the partial compilation may generate a partial executable quantum circuit from an initial cycle (e.g., cycle 1) until cycle 800. After every execution of the partial executable quantum circuit, statuses of qubits (also referred to as 'states' or 'values') may be determined, measured, or the like, such as in order to determine a statistically significant state of the qubits. In some exemplary embodiments, a state may be determined for a qubit, e.g., based on a statistical analysis or manipulation of the density matrixes that were sampled or obtained after each execution, based on a statistical analysis or manipulation of quantum tomography techniques, or the like. For example, after each execution of the partial executable quantum circuit, a density matrix of a qubit may be sampled, and accumulated to generate a statistically significant averaged or combined measurement of the density matrix that is based on multiple samples of the density matrix of the same qubit.

In some exemplary embodiments, one or more candidate auxiliary qubits may be initially selected, detected, determined to be candidate qubits, or the like, from the entire group of qubits of the quantum circuit. Alternatively, all qubits may be initially regarded as candidate qubits. In some exemplary embodiments, a qubit may be selected as a candidate qubit in case the qubit is determined to be idle, e.g., based on a determination that the candidate auxiliary qubit is not an output qubit, is not an auxiliary qubit, is not utilized by one or more cycles succeeding the intermediate cycles, based on a previous compilation of the quantum circuit, or the like. For example, a qubit may be determined to be idle if it is not used by any subsequent cycle, if it is not used by cycles of a target functional block, or the like. In some exemplary embodiments, at each cycle or point in time, qubits may be classified as output qubits that are measured at the end of the circuit and cannot be candidate qubits, required qubits that are utilized in one or more future cycles of the circuit and cannot be candidate qubits at least with respect to the future cycles, and clean auxiliar qubits that cannot be candidate qubits. The remaining qubits or portion thereof may be classified as candidate qubits. For example, a candidate qubit may comprise a qubit that was released by a function at cycle 50 after being manipulated thereby, in a dirty state.

In some exemplary embodiments, one or more additional filters may or may not be used to select candidate qubits from the remaining qubits. In some exemplary embodiments, a qubit may be selected as a candidate qubit in case that a number of usages of the candidate auxiliary qubit in the quantum circuit is determined to be below a threshold. In some exemplary embodiments, a qubit may be analyzed to determine metrics thereof such as how many gates it was used for, a depth thereof (e.g., a number of cycles using the qubit), what type of gates were used to manipulate the qubit, or the like, and may be selected or not selected as a candidate qubit based thereon. For example, gate types may include identity gates, Pauli gates, square root of NOT gates, controlled gates, CNOT gates, CX gates, CY gates, CZ gates, phase shift gates, controlled phase shift gates, Hadamard gates, swap gates, Toffoli gates, or the like. In some exemplary embodiments, candidate auxiliary qubits may be selected based on a connectivity status thereof, a noise level, or the like. In some exemplary embodiments, candidate auxiliary qubits may be selected to be candidate qubits based on any other calculation, metric, parameter, property, or the like.

In some exemplary embodiments, a connectivity status of qubits may be determined, indicating which qubits are connected to which qubits, and to what degree. In some exemplary embodiments, a close connection to between an inspected qubit and a target qubit may increase the probability of selecting the inspected qubit as a candidate qubit, and vice versa. In some exemplary embodiments, a connectivity status between two hardware qubits of a designated hardware platform that are estimated to be assigned to logical qubits may be determined based on mapping information, and may influence a performance of the quantum circuit. For example, in case two physical qubits are physically connected, it may be advantageous to allocate thereto logical qubits that participate in multiple gates together.

In some exemplary embodiments, a noise level of a qubit may be determined, indicating an error rate or estimation thereof that is associated with the qubit. In some exemplary embodiments, the noise level may indicate, for a qubit, with which other qubits it shares multi qubit gate, and how many, which may affect an error rate of the density matrix of the qubit. In some exemplary embodiments, a noise level may depend on the gates used on it. For example, cycles that manipulate a qubit with gates may increase an error rate of the qubit more than empty cycles in which the qubit is not manipulated by gates. In some exemplary embodiments, for each qubit, it may be determined how noisy the qubit was so far. In some exemplary embodiments, every qubit, even a clean auxiliary qubit, may still have noise associated with it, corresponding to the cycles and gates of the qubit, since empty cycles also affect a noise level. In some exemplary embodiments, some gates may be more important than others, e.g., having a stronger effect on a noise level than other gates. For example, a qubit that is manipulated by a small number of gates of a first type may be considered to be noisier than a qubit that is manipulated by a greater number of gates of a second type. In some exemplary embodiments, a low noise level of an inspected qubit may increase a probability of selecting the inspected qubit, and vice versa.

In some exemplary embodiments, a qubit may be analyzed, e.g., to determine its noise level, its estimated connectivity, or any other property thereof, based on a forward analysis of the circuit that was not yet compiled, based on a backward analysis of the circuit that was already compiled, or the like. In some exemplary embodiments, the backward analysis may be determined for the cycles that were already decided on, cycles that were compiled, or the like, of the circuit. In some exemplary embodiments, the forward analysis may utilize some of the functions with which the qubit will be involved in the future, e.g., based on one or more representations of functional blocks of the circuit, information on future connectivity, future errors which we can use for making current decisions, or the like. In some exemplary embodiments, a functional block may represent a function within the quantum circuit, and may define an operation of the quantum circuit over at least two cycles, over at least two gates, using at least two qubits, or the like.

In some exemplary embodiments, qubits may be selected to be candidate qubits in case they comply with one or more constraints, have a score that overpasses a threshold, or the like. For example, the score may comprise a combined score of multiple parameters of the qubit, such as its connectivity level, its noise level, its size, an ease of freeing (e.g., disentangling) the qubit, whether a controlled propagation operation can be used to clean the qubit, or the like, and may or may not be based on a weight function, an average, or the like. In some exemplary embodiments, constraints may comprise obligatory conditions that must be complied with, such as the qubit being idle, the qubit not being an output qubit, or the like.

On Step 130, the candidate auxiliary qubits (that are selected on Step 120) may be classified to a respective qubit class, e.g., with respect to a target group of one or more qubits, with respect to a state of the candidate auxiliary qubits, or the like. In some exemplary embodiments, in case a qubit class is defined with respect to the target group of one or more qubits, the qubit class may comprise a separable class, a product class, an entangled class, or the like. In some exemplary embodiments, in case a qubit class is defined with respect to the state of a candidate auxiliary qubit, the qubit class may comprise a pure class and a mixed class. In some exemplary embodiments, a qubit class may be defined with respect to the target group of one or more qubits, which may be comprised in the group of qubits of the quantum circuit. For example, the target group of one or more qubits may comprise a sub-group of the group of qubits of the quantum circuit, the entire group of qubits of the quantum circuit, or the like. In some exemplary embodiments, the target group of one or more qubits may comprise all qubits to be utilized after the intermediate cycles in accordance with the quantum circuit. In some exemplary embodiments, the target group of one or more qubits may comprise qubits of interest that are configured to be utilized within one or more functional blocks, e.g., after the intermediate cycles.

In some exemplary embodiments, the candidate auxiliary qubits may be classified to a qubit class in response to a determination that the candidate auxiliary qubits are idle. In some exemplary embodiments, the candidate auxiliary qubits may be classified to a qubit class in response to determining that a number of usages of the candidate auxiliary qubit in the quantum circuit is below a threshold. In some exemplary embodiments, the candidate auxiliary qubits may be classified to a qubit class in response to any other determination, e.g., performed on Step 120. In some exemplary embodiments, the candidate auxiliary qubits may be classified based on their measured state, which may be determined based on samples of a density matrix, based on quantum tomography, based on simulations, or the like.

In some exemplary embodiments, the separable class, product class, and entangled class may indicate, for one or more candidate auxiliary qubits, a relationship between each candidate auxiliary qubits and the target group of one or more qubits. In some exemplary embodiments, the relationship may indicate whether the candidate auxiliary qubits are entangled with the target group of one or more qubits, whether the candidate auxiliary qubits are separable from the target group of one or more qubits, whether the candidate auxiliary qubits are separable and product from the target group, or the like. In some exemplary embodiments, in case the candidate auxiliary qubits are separable from the target group of one or more qubits, the candidate auxiliary qubits can be further classified to a pure class or a mixed class. Alternatively, the candidate auxiliary qubits may be first classified to a state, including a pure and mixed state, and then classified according to their relationship with the target group of one or more qubits (e.g., to a separable or entangled class).

In some exemplary embodiments, qubits may be classified to qubit classes based on the measurements of Step 120, e.g., based on samples of the density matrix of the qubits, a quantum tomography thereof, a simulation, or the like. In some exemplary embodiments, the state of a group of qubits may be characterized by its density matrix, as disclosed in 'en.wikipedia.org/wiki/Density_matrix#Definition_and_motivation', which is hereby incorporated by reference in its entirety for all purposes without giving rise to disavowment. In some exemplary embodiments, a qubit class to which a group of qubits is classified may indicate a state or density matrix of the group of qubits, e.g., with respect to the target group of one or more qubits, with respect to the universe, or the like. For example, a computer may measure the density matrix of a qubit to determine whether the qubit is entangled or separable, with respect to a defined group of qubits, e.g., the target group of one or more qubits. In some exemplary embodiments, in case a classical predictor can predict all changes of a density matrix over each cycle, the qubits may be considered separable.

In some exemplary embodiments, in case a group of one or more candidate auxiliary qubits are classified to the entangled class, the group may not be usable as auxiliary qubits, and may not be added to the qubit pool, e.g., although sub-groups of the entangled group, or individual qubits within the entangled group may not be entangled with the target group and may be used, potentially, for the qubit pool. For example, every individual qubit in a first group may not entangled with every individual qubit of a second group, and yet the first and second groups may be entangled with each other. In some exemplary embodiments, two disjoint groups of qubits may be considered to be entangled with each other in case one or more conditions are met, e.g., as disclosed in 'en.wikipedia.org/wiki/Separable_state#Separability_of_bipartite_systems', which is hereby incorporated by reference in its entirety for all purposes without giving rise to disavowment. In some exemplary embodiments, a candidate auxiliary qubit may be classified to the entangled class based on measuring an entanglement state of a qubit or group of qubits over multiple executions of the partially compiled quantum circuit. In some exemplary embodiments, a candidate auxiliary qubit may be classified to the entangled class, indicating that the candidate auxiliary qubit is entangled with the target group of one or more qubits, based on measurements of the qubit's density matrix. In some exemplary embodiments, given the density matrixes of all qubits in the union of two disjoint groups, the two groups may be classified as entangled or not, such as according to 'en.wikipedia.org/wiki/Separable_state#Testing_for_separability', which is hereby incorporated by reference in its entirety for all purposes without giving rise to disavowment. In some exemplary embodiments, entanglement states of qubits may be determined in any other way, such as by analysis, by construction, simulation, or the like.

In some exemplary embodiments, in case two groups of qubits are not entangled with each other, they may be referred to as separable groups of qubits, e.g., as disclosed in 'physics.stackexchange.com/questions/340750/why-are-states-that-are-separable-but-not-simply-separable-considered-to-be-unen', which is hereby incorporated by reference in its entirety for all purposes without giving rise to disavowment. In some exemplary embodiments, in case two groups of qubits are not entangled with each other, and are not correlated with each other, they may be referred to as product groups of qubits that are product with each other. In some exemplary embodiments, separable and product groups of qubits may be searched for and potentially added to the qubit pool.

In some exemplary embodiments, in case a candidate auxiliary qubit is not entangled with the target group of qubits, the candidate auxiliary qubit may be classified to a pure state or a mixed state. In some exemplary embodiments, a group of qubits may be in a pure state in case it is separable from the group comprising the rest of the universe, e.g., indicating that there is no qubit external to the group of qubits that is entangled to the group of qubits. In some exemplary embodiments, a pure group of qubits may be separable from any other disjoint group of one or more qubits. In some exemplary embodiments, a group of qubits can be considered pure even in case one or more qubits within the group of qubits are entangled with each other. In some exemplary embodiments, a group of one or more qubits may be classified to a pure class, in case they are in a pure state, e.g., in case they comply with one or more conditions, as disclosed in 'en.wikipedia.org/wiki/Density_matrix#Pure_and_mixed_states', which is hereby incorporated by reference in its entirety for all purposes without giving rise to disavowment. For example, a group of qubits may be classified to a pure class in case its density matrix is of rank 1, as disclosed in 'en.wikipedia.org/wiki/Rank_(linear_algebra)#Computing_the_rank_of_a_matrix', which is hereby incorporated by reference in its entirety for all purposes without giving rise to disavowment. In some cases, in case that the group of qubits is pure, the density matrix of the qubits may comprise its wavefunction. In some exemplary embodiments, a value of a qubit or group of qubits that is classified as pure, may refer to its wavefunction.

In some exemplary embodiments, in case a group of qubits is not pure, the group may be classified to a mixed class. In some exemplary embodiments, a group of qubits may be classified to a mixed class even in case that the group is separable or product from the target qubits. In some cases, a group of qubits may be classified to a mixed class in case it is not separable from the group comprising the rest of the universe, but may be separable from a defined group of qubits (e.g., the target group of one or more qubits), or from any other qubit. For example, a candidate qubit may be determined to be product to the group of one or more qubits, indicating that they are not entangled and are not correlated with the group of one or more qubits, yet the candidate qubit may be classified to the mixed class. In some exemplary embodiments, a mixed state may indicate that the qubit (or group of qubits) has no wavefunction that can be measured. In some exemplary embodiments, since a mixed qubit has no wavefunction, a value or state of the mixed qubit may refer to its density matrix.

In some exemplary embodiments, candidate qubits may be classified to one or more qubit classes, e.g., two or more qubit classes. For example, a candidate qubit that is separable from the target qubits and is in a mixed state, may be classified to the separable qubit class and to the mixed qubit class. As another example, a candidate qubit that is separable from the target qubits, product from the target qubits, and is in a pure state, may be classified to the separable qubit class, the product qubit class, and the pure qubit class. In some exemplary embodiments, based on the classification of candidate qubits to qubit classes, one or more candidate qubits may be selected for transforming them to usable auxiliary qubits (referred to as 'processing qubits'). For example, qubits may be classified as separable or entangled in relation to the target group, and their state may be classified as mixed or pure. In case a pure qubit candidate is detected, the pure qubit candidate may be selected to be a processing qubit with higher priority than mixed qubits. In some exemplary embodiments, processing qubits may be selected according to a priority rank, which may prioritize pure qubits over any other qubits, prioritize separable qubits over entangled qubits, or the like. For example, a predetermined number of qubits with the highest priority may be selected for processing, only pure qubits may be selected for processing, or the like. In some exemplary embodiments, processing qubits may be selected according to a constraint, such as a constraint on a number of separable qubits that may be selected from each group of qubits, e.g., from a separable group of qubits. In some exemplary embodiments, processing qubits may be selected based on their qubit class, their measured state, one or more properties thereof, contextual properties, measurements of properties, determined thresholds, determined constraints, or the like.

In some exemplary embodiments, in some cases, processing qubits may be usable as auxiliary qubits without requiring disentangling the qubits, such as in the case of pure qubits. In some exemplary embodiments, processing qubits may require, in some cases, one or more cleaning operations in order to become usable as an auxiliary qubit, such as in case that a current value held by a processing qubit cannot be used by future cycles. In some exemplary embodiments, a group of separable qubits may not necessarily be usable as a group. For example, in some cases, only a subgroup of the separable qubits may be cleaned, such as in case measuring a first separable qubit of the group causes a second separable qubit to become entangled with the target qubits. In some exemplary embodiments, in case a qubit within a separable qubit group becomes a clean usable auxiliary qubit, remaining separable qubits of the group may be measured again, such as in order to determine whether they have become entangled. In some exemplary embodiments, in case the processing qubits comprise only entangled qubits, subgroups of the qubit groups may be measured to identify one or more separable qubits within the entangled processing qubits.

On Step 140, the quantum circuit may be modified to apply, at or after the intermediate cycles, a cleaning process on the candidate auxiliary qubits that were selected for processing, whereby obtaining a modified quantum circuit. In some exemplary embodiments, prior to continuing the compilation, the processing qubits may be further processed to create therefrom clean and usable auxiliary qubits. In some exemplary embodiments, a processing qubit (including a group of one or more qubits) may be configured to be cleaned in order to become usable, or alternatively, instead of cleaning the processing qubit, the qubit may be marked as an auxiliary qubit with a currently measured state or value, the state of the qubit may be modified without setting its state to the ground state, or the like. For example, for qubits that are not configured to be cleaned, or can be used with their current state, a cleaning process may not be performed.

In some exemplary embodiments, the processing qubits may be configured to become usable by selecting a cleaning process thereto, selecting a disentangling process in some cases, marking a value (e.g., a wavefunction) thereof, or the like. In some exemplary embodiments, based on the qubit classes assigned to each processing qubit, a cleaning process of the processing qubits may be selected. In some cases, a single cleaning process may be used for a group of one or more processing qubits. In some cases, a cleaning process may be used for a subgroup of one or more processing qubits, e.g., in the case of a mixed group. In some exemplary embodiments, selecting the cleaning process may be performed with respect to at least two alternative cleaning processes. In some exemplary embodiments, the cleaning process may be selected from performing a reset operation on the candidate auxiliary qubit, performing a controlled propagation operation on the candidate auxiliary qubit, performing a controlled propagation operation of a subgroup of the candidate auxiliary qubit (referred to as 'a partial set operation'), or the like. In some exemplary embodiments, cleaning qubits may be performed by settings their value to the ground state, measuring their value, subtracting their value, or the like.

In some exemplary embodiments, a cleaning operation may be selected based on one or more qubit classes of a processing qubit. In some cases, some cleaning operations may be applicable to a qubit class, while other may not. For example, in some cases, all cleaning processes may be applicable to qubits classified as pure class, while some cleaning processes may not be applicable to qubits classified as mixed class. In some exemplary embodiments, in case a processing qubit is from a pure class, a selected cleaning process may include a reset operation at execution time, controlled propagation operation at compilation time, or a partial set operation at compilation time. In some exemplary embodiments, in case a processing qubit is from a mixed class, and is separable from the target qubits, a selected cleaning process may include a reset operation at execution time, or a partial set operation at compilation time, while controlled propagation operation may not be applicable and therefore not be selected. In some exemplary embodiments, a determination as to whether a qubit can be cleaned without measurements may be performed, as this may be preferable over measurements.

In some exemplary embodiments, the controlled propagation operation may be performed based on the state or value of the candidate auxiliary qubit. In some exemplary embodiments, the controlled propagation operation may be configured to modify the value of the qubit, e.g., to obtain a desired value, a zero value, or the like. In some exemplary embodiments, setting of a value to its original state can be performed using the controlled propagation operation disclosed in U.S. application Ser. No. 17/354,504, titled "CONTROLLED PROPAGATION IN QUANTUM COMPUTING", filed Jun. 22, 2021, which is hereby incorporated by reference in its entirety for all purposes without giving rise to disavowment. In some exemplary embodiments, the controlled propagation operation may be performed by utilizing a transformative quantum program that is configured to transform the value of the target qubit from its observed value (V1) to a target value (V2). In some exemplary embodiments, the transformative quantum program may be applied to the qubits, as a program, during the cycle(s) in which the controlled propagation command is scheduled to be performed.

In some exemplary embodiments, for a group of qubits of size n, which is separable from the qubits of interest (e.g., the target group of one or more qubits), the maximal number of qubits that may undergo the controlled propagation, denoted m, may be determined by the rank, denoted r, of the density matrix of the separable group, e.g., as disclosed in 'en.wikipedia.org/wiki/Rank_(linear_algebra)#Computing_the_rank_of_a_matrix', which is hereby incorporated by reference in its entirety for all purposes without giving rise to disavowment. In some exemplary embodiments, in case r is not greater than $2^{n-m}$, then m qubits may be released from the group of qubits. In some exemplary embodiments, in case m qubits are the total number of qubits in the group, a controlled propagation operation may be performed to the group of qubits. In some exemplary embodiments, in case m qubits is less than the total number of qubits in the group, a partial controlled propagation operation may be performed, also referred to as 'partial set' operation. In some exemplary embodiments, the partial set operation may be configured to perform a controlled propagation operation for a portion of the qubits in the group.

In some exemplary embodiments, an algorithm for performing a partial or full controlled propagation operation may be as follows:
 1. Pick r orthogonal pure states on n-m qubits.
 2. Consider the r orthogonal pure states on n qubits constructed in the following manner:
    for each state in Step 1, construct a pure state on n qubits, given by 0 on the m qubits to be released, and the state from step 1 on the remaining n-m qubits.
 3. Find the ensemble of pure states comprising the density matrix.
 4. Pick a unitary matrix which maps each pure state in the ensemble (Step 3) to the pure states selected on Step 2.
 5. Apply quantum gates that implement the unitary matrix to the quantum circuit.

In some exemplary embodiments, the reset operation may be configured to reset qubits into the ground state, such as by measuring the state of a qubit, e.g., as disclosed in 'quantum-computing.ibm.com/lab/docs/iql/manage/systems/midcircuit-measurement/', and/or in 'quantum-computing.ibm.com/lab/docs/iql/manage/systems/reset/backend_reset', which are hereby incorporated by reference in their entirety for all purposes without giving rise to disavowment. In some exemplary embodiments, the reset operation may be configured to measure the qubit at execution time. In some cases, a reset operation may be performed by measuring the qubit before the program is executed, enabling the compilation to be continued while taking into account the reset measurement, flipping the measured value, or the like. However, such measurements introduce uncertainty that may be accounted for as noise, and therefore the measurements may advantageously be used only for cleaning a qubit and not for estimating its value.

In some exemplary embodiments, a resource utilization of cleaning operations may be determined, and the cleaning process may be selected based on the resource utilization. In some exemplary embodiments, a cleaning process may be selected based on constraints, based on user preferences regarding a tradeoff between compilation time consumption and execution time consumption, or the like.

In some exemplary embodiments, different cleaning processes may, in some cases, be selected for different qubits of a same group of qubits. In some exemplary embodiments, a qubit group may comprise at least first and second subgroups of candidate auxiliary qubits. The first candidate auxiliary qubit may be classified to a first qubit class, e.g., a pure class, while the second candidate auxiliary qubit may be classified to a different class, e.g., a second qubit class such as a mixed class, with respect to the group of one or more qubits. Alternatively, both qubits may be classified to a same qubit class. In some exemplary embodiments, based on the classifications, and/or one or more other calculations (e.g., resource constraints), the quantum circuit may be modified to apply, after the intermediate cycles, a first cleaning process on the first candidate auxiliary qubit, and a second cleaning process on the second candidate auxiliary qubit. In some exemplary embodiments, the first cleaning process and the second cleaning process may be of different cleaning process types. For example, the first cleaning process may be a reset operation and the second cleaning process may be a partial set operation. In some cases, a controlled propagation operation may not be used for subgroups of qubits within a group of qubits that is measured and classified.

In some exemplary embodiments, modifying the quantum circuit may comprise utilizing a candidate auxiliary qubit that is scheduled to be cleaned as an auxiliary qubit in the modified quantum circuit. In some exemplary embodiments, modifying the quantum circuit may comprise, in some cases, utilizing a disentangling operation for qubits that became entangled during the cleaning or measurement process. In some exemplary embodiments, the disentangling operation may comprise measuring the qubit's value during execution, during compilation, or disentangling the qubit in any other way. In some exemplary embodiments, after cleaning a qubit or qubit group, the qubit may become usable, and may be added to the qubit pool.

In some cases, such as in case a processing qubit is required for later cycles, modifying the quantum circuit may comprise applying, after the cleaning process, a restore process for restoring a state of the candidate auxiliary qubit to its previous state, before it was cleaned and used. In some exemplary embodiments, a qubit may be analyzed (e.g., using forward analysis) to determine when the qubit will be reused, enabling to use the qubit and restore its state prior to the scheduled usage of the qubit. In some exemplary embodiments, the restore process may be performed in one or more second intermediate cycles succeeding the intermediate cycles and preceding the final cycle.

On Step 150, the compilation of the modified quantum circuit may be continued from the intermediate cycles until the final cycle, whereby obtaining an executable quantum circuit. In some exemplary embodiments, the executable quantum circuit may comprise the initial cycle, the intermediate cycles, and the last or final cycle.

In some exemplary embodiments, the executable quantum circuit may be configured to apply the cleaning process on the candidate auxiliary qubits after the intermediate cycles, e.g., subsequently thereto. In some exemplary embodiments, modifying the quantum circuit to apply after the intermediate cycles one or more cleaning processes of candidate auxiliary qubits, may add at least one cycle to the executable quantum circuit. In some exemplary embodiments, the executable quantum circuit may be executed by a quantum computer, a simulator, or the like.

Figure 2:
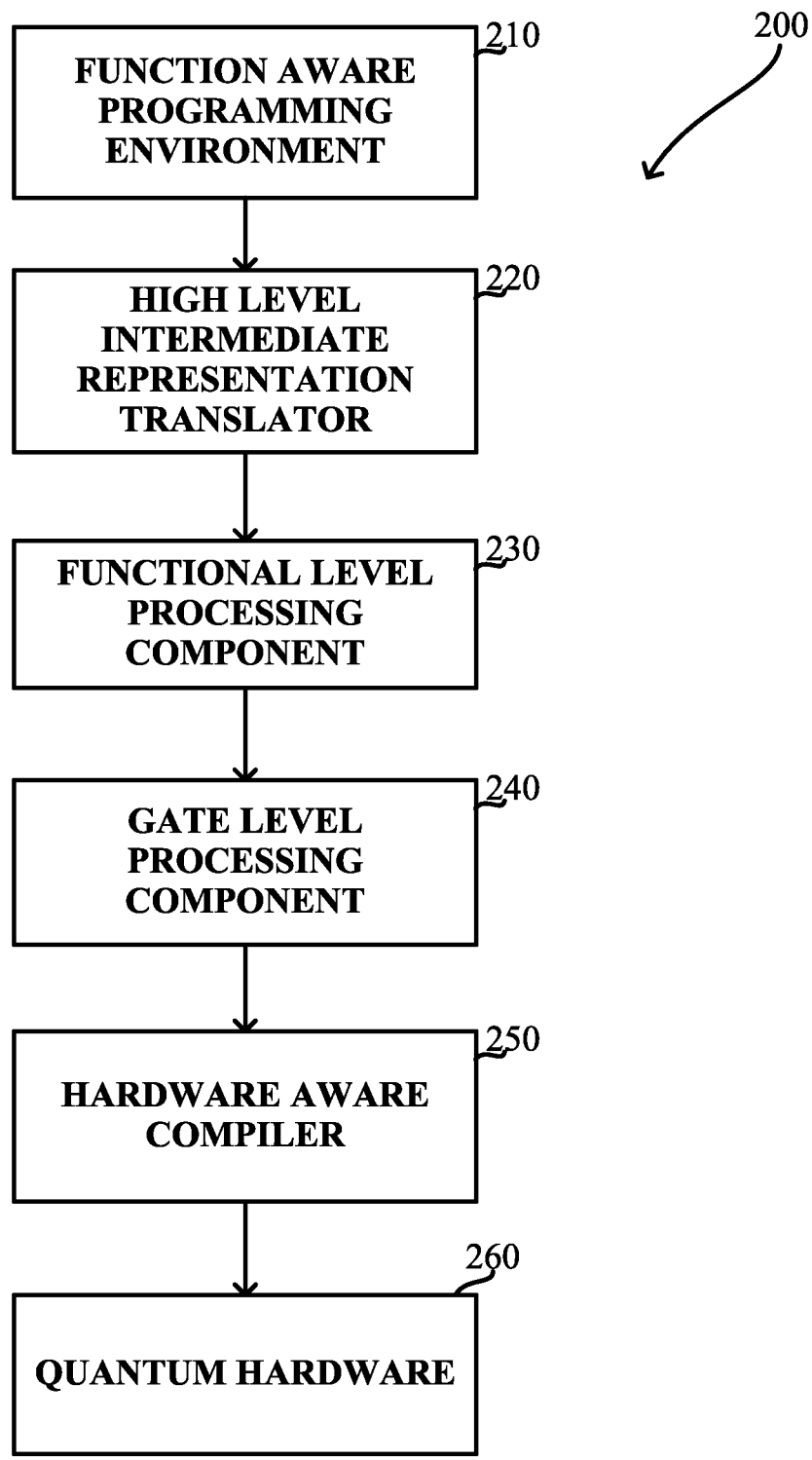
FIG. 2 shows an exemplary environment, in accordance with some exemplary embodiments of the disclosed subject matter.

Referring now to FIG. 2, showing an exemplary environment, in accordance with some exemplary embodiments of the disclosed subject matter.

In some exemplary embodiments, Environment 200 may correspond to the environment disclosed in U.S. application Ser. No. 17/450,583, titled "FUNCTIONAL-LEVEL PROCESSING COMPONENT FOR QUANTUM COMPUTERS", filed Oct. 12, 2021, which is hereby incorporated by reference in its entirety for all purposes without giving rise to disavowment.

In some exemplary embodiments, Environment 200 may comprise a Functional Aware Programming Environment 210. In some exemplary embodiments, Functional Aware Programming Environment 210 may comprise a programming environment that supports one or more high level programming languages for programming a quantum program, in an abstract form that does not necessarily refer to a qubit set, a gate set, or the like. Functional Aware Programming Environment 210 may utilize libraries with functions, variable types, or the like, e.g., QCL™ libraries.

In some exemplary embodiments, using Functional Aware Programming Environment 210, a programmer may program a high-level quantum program. In some exemplary embodiments, the quantum program may specify high level functions, low level components such as gates, or the like. The high-level quantum program may comprise one or more function blocks. In some exemplary embodiments, a functional block may be a logical abstraction of a sub-circuit having a predetermined functionality. In some exemplary embodiments, the functional block may represent a sub-circuit that is executed over two or more cycles, using two or more qubits, using two or more quantum gates, or the like. In some cases, in addition to the one or more function blocks, the quantum program may or may not include one or more gate-level components such as gates.

In some exemplary embodiments, Environment 200 may comprise a High Level Intermediate Representation (IR) Translator 220, which may comprise a front end processing component. In some exemplary embodiments, a quantum program created at Functional Aware Programming Environment 210 may be provided to High Level IR Translator 220, for further processing. In some exemplary embodiments, High Level IR Translator 220 may be configured to translate the quantum program to a high level IR representation, including a language-independent intermediate representation of the program's code. In some exemplary embodiments, High Level IR Translator 220 may translate the quantum program from any programming language to a high level intermediate representation. In some exemplary embodiments, the high level IR may represent the functions in the high level programming language. In some exemplary embodiments, High Level IR Translator 220 may be hardware agnostic, as it may not specify a quantum instruction or gate set.

In some exemplary embodiments, Environment 200 may comprise a Functional Level Processing Component 230, which may be hardware-aware and functional-aware. In some exemplary embodiments, Functional Level Processing Component 230 may obtain the IR functional-level representation of the quantum program from High Level IR Translator 220, in addition to one or more hardware constraints, user preferences, or the like. In some exemplary embodiments, Functional Level Processing Component 230 may operate software tools on the program, while taking into account hardware information and optimization information. In some exemplary embodiments, Functional Level Processing Component 230 may be configured to determine a gate-level implementation for the high level program based on optimizations that are determined using a functional understating of the written functions, hardware data, user constraints, or the like.

In some exemplary embodiments, Environment 200 may comprise a Gate Level Processing Component 240. In some exemplary embodiments, Gate Level Processing Component 240 may obtain from Functional Level Processing Component 230 a gate-level representation of the quantum program, and potentially one or more additional schedules, allocations, instructions, metadata, or the like. In some exemplary embodiments, Gate Level Processing Component 240 may create a logical program by scheduling each gate or functional block within the logical program, allocating qubits and cycles for each gate, connecting qubits from some functional blocks to other functional blocks, or the like.

In some exemplary embodiments, Environment 200 may comprise a Hardware Aware Compiler 250 and a Quantum Hardware 260. In some exemplary embodiments, Hardware Aware Compiler 250 may obtain the logical program from Gate Level Processing Component 240, or a low level IR thereof, and compile the program into a machine representation. In some exemplary embodiments, Hardware Aware Compiler 250 may be specifically tailored to match Quantum Hardware 260, e.g., to implement the program using available hardware gates, qubits, or the like, based on hardware constraints of Quantum Hardware 260. In some exemplary embodiments, Hardware Aware Compiler 250 may allocate hardware qubits to abstract logical qubits, hardware gates to logical gates, or the like. In some exemplary embodiments, each abstract qubit may be allocated a physical concrete qubit from the auxiliary poor, such as qubit number 224 in Quantum Hardware 260, or any other qubit identifier. In some exemplary embodiments, the resulting quantum circuit may be executed on the Quantum Hardware 260 or in a simulator thereof. In some exemplary embodiments, a quality of the resulting executable quantum circuit may be evaluated using one or more evaluation tools, which may be associated to the specific properties of Quantum Hardware 260.

In some exemplary embodiments, a circuit may be partially compiled by Functional Level Processing Component 230, Gate Level Processing Component 240, and/or Hardware Aware Compiler 250. In some exemplary embodiments, a circuit may be partially compiled at one or more intermediate cycles, including at least one intermediate cycle that excludes the initial cycle and excludes the final cycle. For example, the circuit may be partially compiled by Functional Level Processing Component 230, which may translate a functional-level representation of a portion of a circuit to a gate-level representation of the portion of the circuit that may be executable at a simulator, a classic computer, or the like. As another example, the circuit may be partially compiled by Gate Level Processing Component 240, which may translate the gate-level representation from Functional Level Processing Component 230 to a logical program that may be executable at a simulator, a non-quantum computer, or the like. As another example, the circuit may be partially compiled by Hardware Aware Compiler 250, which may translate the gate-level representation to a machine representation that is executable over Quantum Hardware 260.

In some exemplary embodiments, after compiling the portion of the circuit, one or more measurements may be performed, e.g., by Gate Level Processing Component 240, Functional Level Processing Component 230, or the like. In some exemplary embodiments, the measurements may include executing the compiled portion of the circuit multiple times, and sampling density matrixes every execution, to thereby measure the density matrixes. In some exemplary embodiments, based on the measurements, qubits may be selected to be added to the qubit pool, and cleaning processes may or may not be selected and scheduled for each qubit that is being added to the qubit pool. In some exemplary embodiments, the circuit may be modified to add additional cycles, e.g., implementing selecting cleaning processes.

Figure 3:
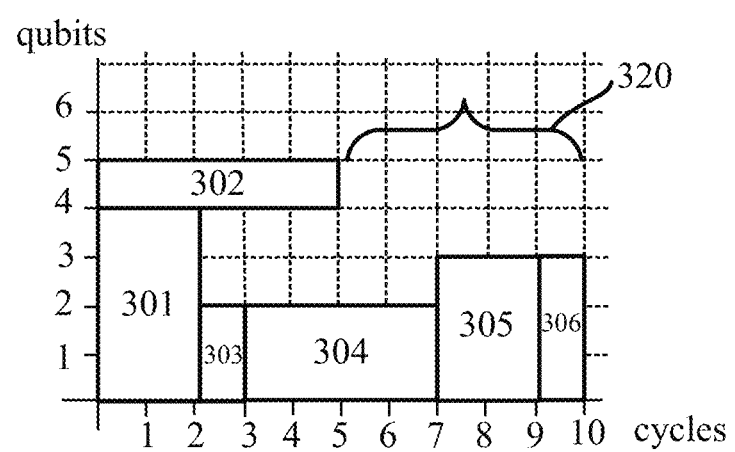
FIG. 3 shows an exemplary quantum circuit, in accordance with some exemplary embodiments of the disclosed subject matter.

Referring now to FIG. 3, showing an exemplary quantum circuit, in accordance with some exemplary embodiments of the disclosed subject matter.

FIG. 3 exemplifies a quantum circuit implementing six function blocks or gates, e.g., by Implementations 301, 302, 303, 304, 305, 306. Each implementation has a different resource utilization illustrated as a rectangular area showing the qubits which are utilized thereby and the number of cycles in which they are used. In some exemplary embodiments, the quantum circuit may manipulate qubits 1-5 during cycles 1 and 2, and qubits 1, 2, 4, and 5 during cycles 3-5.

In some exemplary embodiments, upon qubits 4 and 5 reaching cycle 5, and qubits 3 and 6 reaching cycle 2, the compilation may be halted, and one or more groups of one or more candidate qubits may be identified. In some exemplary embodiments, candidate qubits may be determined to include qubits 5-6, as they are not utilized in the subsequent cycles of portion thereof, and are not output qubits. In some cases, although all of qubits 4-6 may be idle during Timeframe 320, which may be a remaining timeframe after cycle 5 or portion thereof, qubit 4 may not be selected as a candidate due to a high noise level, due to being an output qubit, or the like. Alternatively, any other qubits may be determined as candidate qubits.

In some exemplary embodiments, measurements may be made to identify a qubit class of the qubits. In some exemplary embodiments, measurements may be made by executing a partial executable quantum circuit, including a compiled version of the circuit between cycles 1 and 5 for qubits 1, 2, 4, and 5, and between cycles 1 and 2 for qubits 3 and 6, multiple time. In some exemplary embodiments, based on the measurements, qubits 5 and 6 may be each classified to a qubit class. In some cases, qubit 6 may be classified to a first class, e.g., an entangled class that is entangled with respect to a target group of qubits 1-3, while qubit 5 may be classified to a second class, e.g., a separable class, which may be separable from qubits 1-3. Alternatively, a group of qubits including qubits 5 and 6 may be classified to one or more classes as a group, e.g., a pure class and a separable class.

In some exemplary embodiments, based on the classification, a cleaning process may be selected, and added to the circuit, after which compilation may continue. For example, the cleaning process may be configured to clean qubit 5 individually, to clean the group of qubits 5 and 6 together, or the like. In some exemplary embodiments, every time that a separable qubit or group of qubits is cleaned, disentangled, or the like, a new analysis or measurement may be performed to determine whether the qubit class of the remaining candidate qubits has changed. In some exemplary embodiments, every time that a subgroup of a separable group of qubits is cleaned, such as using a partial set cleaning process, a new analysis or measurement may be performed to determine whether the remaining qubits in the group are still separable from qubits 1-3.

Figure 4:
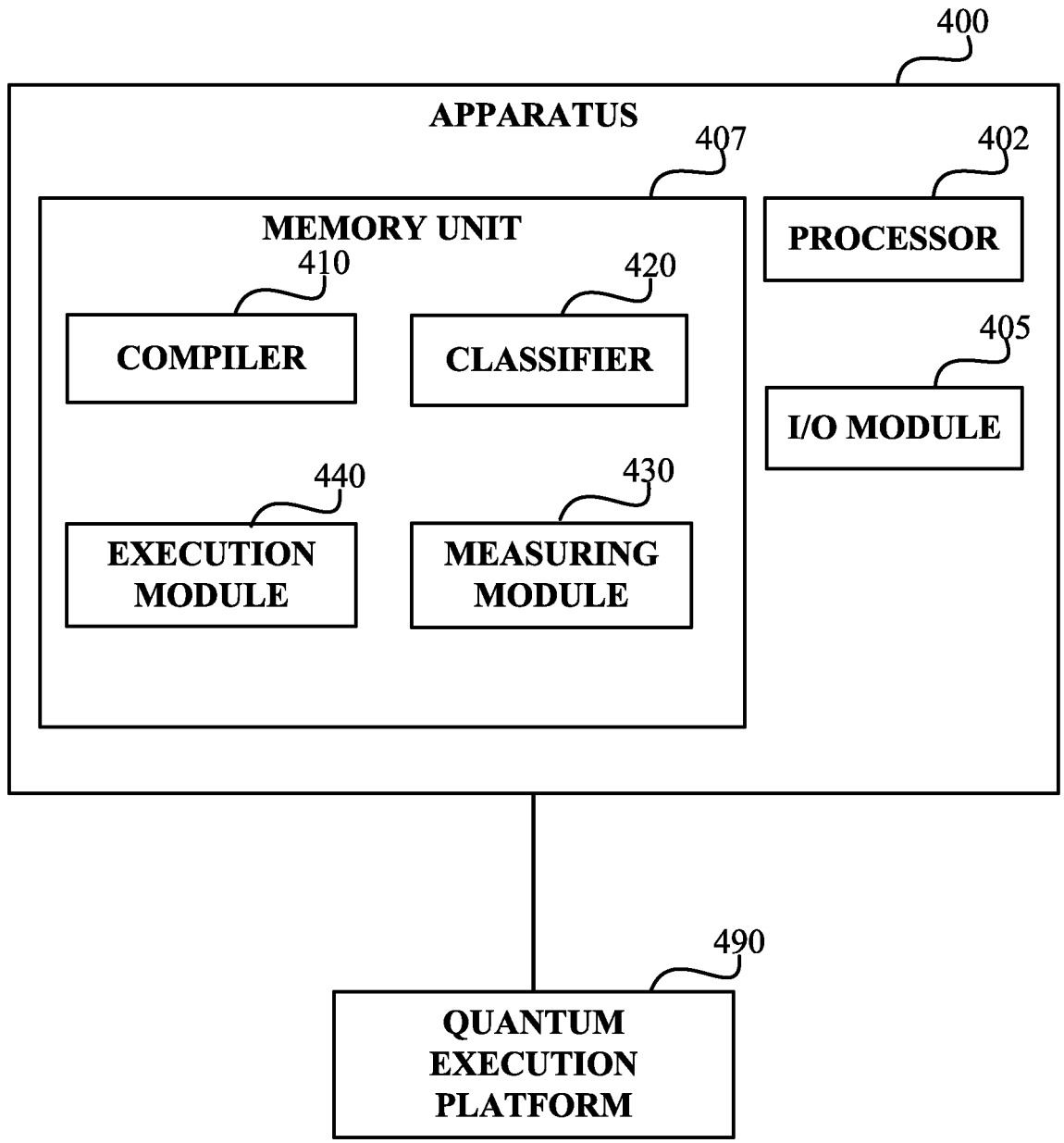
FIG. 4 shows an exemplary block diagram of an apparatus, in accordance with some exemplary embodiments of the disclosed subject matter.

Referring now to FIG. 4 showing a block diagram of an apparatus, in accordance with some exemplary embodiments of the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of its subcomponents. It is noted that Processor 402 may be a traditional processor, and not necessarily a quantum processor.

In some exemplary embodiments of the disclosed subject matter, Apparatus 400 may comprise an Input/Output (I/O) module 405. I/O Module 405 may be utilized to provide an output to and receive input from a user, an apparatus, or the like, such as, for example to obtain a user-defined quantum program, showing circuit illustrations, communicating with quantum hardware, or the like.

In some exemplary embodiments, Apparatus 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400. Memory 407 may comprise one or more components as detailed below, implemented as executables, libraries, static libraries, functions, or any other executable components.

In some exemplary embodiments, Memory 407 may comprise a Compiler 410. Compiler 410 may be configured to process a functional-level representation or a gate-level representation of a quantum circuit to an executable version of the quantum circuit that can be executed on a classic computer, on a simulator, on a quantum computer, or the like.

In some exemplary embodiments, Memory 407 may comprise a Classifier 420. Classifier 420 may be configured to classify one or more qubits, at one or more intermediate cycles between compilation of different portions of the circuit, e.g., compiled by Compiler 410. For example, the compilation of Compiler 410 may be stopped at one or more intermediate cycles, and Classifier 420 may classify qubits after stopping the compilation. Classifier 420 may classify qubits as candidate qubits, such as in case they can potentially be auxiliary qubits, and classify auxiliary qubits to qubit classes, e.g., using Measuring Module 430.

In some exemplary embodiments, Memory 407 may comprise a Measuring Module 430. Measuring Module 430 may be configured to execute a partially compiled quantum circuit multiple times, e.g., on Execution Module 440. Measuring Module 430 may sample, after each execution, a state or value of the qubits, and thereby measure their density matrix. In some exemplary embodiments, the measured state may be used to support Classifier 420 with classifying qubits to classes.

In some exemplary embodiments, Execution Module 440 may be configured to load partially compiled quantum circuits, fully compiled quantum circuits, or the like, onto Quantum Execution Platform 490, or any other execution platform, to be executed thereby. In some exemplary embodiments, Execution Module 440 may simulate execution of the quantum circuit using an emulator, a simulator, or the like, on a classic computer, instead of actual execution by Quantum Execution Platform 490.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
partially compiling a quantum circuit, wherein the quantum circuit comprises a group of qubits that are being manipulated over a plurality of cycles, the plurality of cycles ordered in consecutive order, wherein the plurality of cycles comprise an initial cycle, one or more intermediate cycles and a final cycle, wherein the initial cycle is a first cycle in accordance with the consecutive order having no preceding cycles therebefore, wherein the final cycle is a last cycle in accordance with the consecutive order having no successive cycles thereafter, wherein the one or more intermediate cycles succeed the initial cycle and precede the final cycle in accordance with the consecutive order, wherein said partially compiling comprises compiling the quantum circuit from the initial cycle and until the one or more intermediate cycles, whereby obtaining a partial executable quantum circuit that excludes at least the final cycle;
obtaining measurements regarding a group of a plurality of candidate auxiliary qubits, wherein the group of the plurality of candidate auxiliary qubits is comprised by members of the group of qubits, wherein said obtaining measurements comprises executing the partial executable quantum circuit multiple times;
determining a state of the group of the plurality of candidate auxiliary qubits at the one or more intermediate cycles based on the measurements;
classifying the group of the plurality of candidate auxiliary qubits to a qubit class with respect to a target group of one or more qubits, wherein members of the group of qubits comprise the target group of one or more qubits, wherein the qubit class indicates that the group of the plurality of candidate auxiliary qubits is not entangled with the target group of the one or more qubits;
modifying the quantum circuit to apply after the one or more intermediate cycles a cleaning process on the group of the plurality of candidate auxiliary qubits, thereby obtaining a modified quantum circuit, wherein the cleaning process is a controlled propagation operation, wherein the controlled propagation operation is based on the state of the group of the plurality of candidate auxiliary qubits; and compiling the modifying quantum circuit, thereby obtaining an executable quantum circuit, the executable quantum circuit comprising the last cycle, wherein the executable quantum circuit is configured to apply the cleaning process on the group of the plurality of candidate auxiliary qubits at or after the one or more intermediate cycles, wherein the group of the plurality of candidate auxiliary qubits are configured to be stored on a quantum computing platform executing the executable quantum circuit.

2. The method of claim 1 further comprises selecting, based on the qubit class, a second cleaning process for cleaning the group of one or more candidate auxiliary qubits, wherein said selecting is performed with respect to at least two alternative cleaning processes.

3. The method of claim 1, wherein the second cleaning process is selected from a group consisting of:
performing a reset operation on the group of one or more candidate auxiliary qubits,
performing a controlled propagation operation on the group of one or more candidate auxiliary qubits, and
performing a partial set operation on a portion of qubits within the group of one or more candidate auxiliary qubits.

4. The method of claim 1, wherein the measurements are obtained by sampling at least one density matrix of the group of one or more candidate auxiliary qubits after each execution of the partial executable quantum circuit.

5. The method of claim 1, wherein the target group of one or more qubits comprises all qubits to be utilized after the one or more intermediate cycles in accordance with the quantum circuit.

6. The method of claim 1, wherein the target group of one or more qubits comprises all qubits to be utilized within a functional block after the one or more intermediate cycles.

7. The method of claim 1, wherein said classifying the group of one or more candidate auxiliary qubits is performed with respect to the target group of one or more qubits, wherein said classifying comprises classifying the group of one or more candidate auxiliary qubits into at least one of:
a separable class with respect to the target group of one or more qubits,
a product class with respect to the target group of one or more qubits, and
an entangled class with respect to the target group of one or more qubits,
wherein the group of one or more candidate auxiliary qubits is not classified to the entangled class.

8. The method of claim 1, wherein said classifying comprises classifying the group of one or more candidate auxiliary qubits into one of:
a pure class, and
a mixed class.

9. The method of claim 1, wherein the qubit class is a mixed class, wherein the method further comprises selecting, in response to classifying the group of one or more candidate auxiliary qubits to the mixed class, the cleaning process to comprise a reset operation.

10. The method of claim 1, wherein the qubit class is a pure class, wherein the method further comprises selecting, in response to classifying the group of one or more candidate auxiliary qubits to the pure class, the cleaning process to comprise a reset operation, a partial set operation, or a controlled propagation operation.

11. The method of claim 1 further comprises:
classifying a second group of one or more candidate auxiliary qubits to a second qubit class with respect to the target group of one or more qubits, wherein the group of qubits comprise the second group of one or more candidate auxiliary qubits, wherein the second qubit class is different than the qubit class; and
wherein said modifying the quantum circuit is configured to apply after the one or more intermediate cycles a second cleaning process on the second group of one or more candidate auxiliary qubits, wherein the cleaning process and the second cleaning process are of different cleaning process types.

12. The method of claim 1 further comprising determining a resource utilization of cleaning operations, and selecting the cleaning process based on the resource utilization.

13. The method of claim 1, wherein the group of one or more candidate auxiliary qubits comprises a logical qubit that is not assigned by the quantum circuit to a physical qubit of a quantum computer.

14. The method of claim 1, wherein said classifying is performed in response to a determination that the group of one or more candidate auxiliary qubits is idle, wherein the group of one or more candidate auxiliary qubits is determined to be idle based on a determination that the group of one or more candidate auxiliary qubits does not comprise an output qubit and is not utilized by at least one cycle succeeding the one or more intermediate cycles.

15. The method of claim 1, wherein said classifying is performed in response to a determination that the group of one or more candidate auxiliary qubits is idle, wherein the group of one or more candidate auxiliary qubits is determined to be idle based on a previous compilation of the quantum circuit.

16. The method of claim 1, wherein said classifying is performed in response to determining that a number of usages of the group of one or more candidate auxiliary qubits in the quantum circuit is below a threshold.

17. The method of claim 1, wherein said modifying the quantum circuit to apply after the one or more intermediate cycles a cleaning process on the group of one or more candidate auxiliary qubits adds at least one cycle to the quantum circuit.

18. The method of claim 1, wherein the group of one or more candidate auxiliary qubits comprises two or more individual qubits, wherein said obtaining, said classifying, and said modifying are performed with respect to the two or more individual qubits.

19. The method of claim 1, wherein said modifying further comprises modifying the quantum circuit to apply, after the cleaning process, a restore process for restoring a state of the group of one or more candidate auxiliary qubits, wherein the restore process is performed in one or more second intermediate cycles succeeding the one or more intermediate cycles and preceding the final cycle.

20. The method of claim 1, wherein said modifying further comprises utilizing the group of one or more candidate auxiliary qubits as one or more respective auxiliary qubits in the modified quantum circuit.

21. The method of claim 1 further comprises executing, by a quantum computer, the executable quantum circuit.

22. An apparatus comprising a processor and coupled memory, said processor being adapted to:
partially compile a quantum circuit, wherein the quantum circuit comprises a group of qubits that are being manipulated over a plurality of cycles, the plurality of cycles ordered in consecutive order, wherein the plurality of cycles comprise an initial cycle, one or more intermediate cycles and a final cycle, wherein the initial cycle is a first cycle in accordance with the consecutive order having no preceding cycles therebefore, wherein the final cycle is a last cycle in accordance with the consecutive order having no successive cycles thereafter, wherein the one or more intermediate cycles succeed the initial cycle and precede the final cycle in accordance with the consecutive order, wherein said partially compiling comprises compiling the quantum circuit from the initial cycle and until the one or more intermediate cycles, whereby obtaining a partial executable quantum circuit that excludes at least the final cycle;

obtaining measurements regarding a group of a plurality of candidate auxiliary qubits, wherein the group of the plurality of candidate auxiliary qubits is comprised by members of the group of qubits, wherein said obtaining measurements comprises executing the partial executable quantum circuit multiple times;

determining a state of the group of the plurality of candidate auxiliary qubits at the one or more intermediate cycles based on the measurements;

classifying the group of the plurality of candidate auxiliary qubits to a qubit class with respect to a target group of one or more qubits, wherein members of the group of qubits comprise the target group of one or more qubits, wherein the qubit class indicates that the group of the plurality of candidate auxiliary qubits is not entangled with the target group of the one or more qubits;

modifying the quantum circuit to apply after the one or more intermediate cycles a cleaning process on the group of the plurality of candidate auxiliary qubits, thereby obtaining a modified quantum circuit, wherein the cleaning process is a controlled propagation operation, wherein the controlled propagation operation is based on the state of the group of the plurality of candidate auxiliary qubits; and compiling the modifying quantum circuit, thereby obtaining an executable quantum circuit, the executable quantum circuit comprising the last cycle, wherein the executable quantum circuit is configured to apply the cleaning process on the group of the plurality of candidate auxiliary qubits at or after the one or more intermediate cycles, wherein the group of the plurality of candidate auxiliary qubits are configured to be stored on a quantum computing platform executing the executable quantum circuit.

23. The apparatus of claim 22, wherein the processor is further adapted to select, based on the qubit class, a cleaning process for cleaning the group of one or more candidate auxiliary qubits, wherein said select is performed with respect to at least two alternative cleaning processes.

24. The apparatus of claim 22, wherein the measurements are obtained by sampling at least one density matrix of the group of one or more candidate auxiliary qubits after each execution of the partial executable quantum circuit.

25. A computer program product comprising a non-transitory computer readable medium retaining program instructions, which program instructions when read by a processor, cause the processor to:

partially compiling a quantum circuit, wherein the quantum circuit comprises a group of qubits that are being manipulated over a plurality of cycles, the plurality of cycles ordered in consecutive order, wherein the plurality of cycles comprise an initial cycle, one or more intermediate cycles and a final cycle, wherein the initial cycle is a first cycle in accordance with the consecutive order having no preceding cycles therebefore, wherein the final cycle is a last cycle in accordance with the consecutive order having no successive cycles thereafter, wherein the one or more intermediate cycles succeed the initial cycle and precede the final cycle in accordance with the consecutive order, wherein said partially compiling comprises compiling the quantum circuit from the initial cycle and until the one or more intermediate cycles, whereby obtaining a partial executable quantum circuit that excludes at least the final cycle;

obtaining measurements regarding a group of a plurality of candidate auxiliary qubits, wherein the group of the plurality of candidate auxiliary qubits is comprised by members of the group of qubits, wherein said obtaining measurements comprises executing the partial executable quantum circuit multiple times;

determining a state of the group of the plurality of candidate auxiliary qubits at the one or more intermediate cycles based on the measurements;

classifying the group of the plurality of candidate auxiliary qubits to a qubit class with respect to a target group of one or more qubits, wherein members of the group of qubits comprise the target group of one or more qubits, wherein the qubit class indicates that the group of the plurality of candidate auxiliary qubits is not entangled with the target group of the one or more qubits;

modifying the quantum circuit to apply after the one or more intermediate cycles a cleaning process on the group of the plurality of candidate auxiliary qubits, thereby obtaining a modified quantum circuit, wherein the cleaning process is a controlled propagation operation, wherein the controlled propagation operation is based on the state of the group of the plurality of candidate auxiliary qubits; and compiling the modifying quantum circuit, thereby obtaining an executable quantum circuit, the executable quantum circuit comprising the last cycle, wherein the executable quantum circuit is configured to apply the cleaning process on the group of the plurality of candidate auxiliary qubits at or after the one or more intermediate cycles, wherein the group of the plurality of candidate auxiliary qubits are configured to be stored on a quantum computing platform executing the executable quantum circuit.

* * * * *